United States Patent
Quijada et al.

(10) Patent No.: US 12,039,596 B1
(45) Date of Patent: Jul. 16, 2024

(54) AUTOMATED RULE-BASED ELECTRONIC TRANSACTION DATA ANALYSIS

(71) Applicant: Federal Home Loan Mortgage Corporation (Freddie Mac), McLean, VA (US)

(72) Inventors: Fabio Quijada, Reston, VA (US); Matthew Vincent, Bethesda, MD (US); Andrew Leister, Arlington, VA (US); Spyridon Kontogiorgis, Reston, VA (US)

(73) Assignee: Freddie Home Loan Mortgage Corporation (FREDDIE MAC), McLean, VA (US)

( * ) Notice: Subject to any disclaimer, the term of this patent is extended or adjusted under 35 U.S.C. 154(b) by 0 days.

(21) Appl. No.: 16/120,167

(22) Filed: Aug. 31, 2018

(51) Int. Cl.
*G06Q 40/03* (2023.01)
*G06Q 40/06* (2012.01)
*G06Q 40/12* (2023.01)

(52) U.S. Cl.
CPC .............. *G06Q 40/03* (2023.01); *G06Q 40/06* (2013.01); *G06Q 40/12* (2013.12)

(58) Field of Classification Search
CPC ........ G06Q 40/025; G06Q 40/12; G06Q 40/06
USPC .......................................................... 705/38
See application file for complete search history.

(56) References Cited

U.S. PATENT DOCUMENTS

| | | | |
|---|---|---|---|
| 8,458,074 B2* | 6/2013 | Showalter | 705/36 |
| 9,824,394 B1* | 11/2017 | Boates et al. | G06Q 20/00 |
| 10,546,154 B2* | 1/2020 | Praveen et al. | G06F 21/62 |
| 11,250,162 B2* | 2/2022 | Praveen et al. | G06F 21/62 |
| 2010/0010935 A1* | 1/2010 | Shelton | G06Q 40/00 705/36 |
| 2011/0270779 A1* | 11/2011 | Showalter | G06Q 40/00 705/36 |
| 2012/0239437 A1* | 9/2012 | Harris et al. | 705/4 |
| 2012/0278308 A1* | 11/2012 | Zhou | G06F 17/30 707/715 |

(Continued)

OTHER PUBLICATIONS

Altex Soft, Fraud Detection: How Machine Learning Systems Help Reveal Scams In Fintech, Healthcare and eCommerce, Dec. 21, 2017, Altex Soft, pp. 1-24. (Year: 2017).*

*Primary Examiner* — Scott C Anderson
*Assistant Examiner* — George N. Proios
(74) *Attorney, Agent, or Firm* — Finnegan, Henderson, Farabow, Garrett & Dunner LLP

(57) ABSTRACT

Systems and methods are disclosed for automated rule-based income validation using electronic transaction data. One or more processors receive transaction data associated with a financial account, including data elements representing income transactions. Characteristics of the data elements are analyzed, and an income type label and an income source label are associated with the data elements. A cluster of data elements is identified as associated with a first income source label, the identified cluster including data elements associated with a first income type label. The cluster of data elements is verified, and data associated with the verified cluster is analyzed to determine one or more income streams. Based on a transaction rule associated with the one or more income streams, a composite income is calculated, and a net income associated with the first income type is determined. Based on the determined net income, a gross income distribution is generated.

20 Claims, 10 Drawing Sheets

(56) References Cited

U.S. PATENT DOCUMENTS

| | | | |
|---|---|---|---|
| 2015/0154289 A1* | 6/2015 | Revesz et al. | G06F 17/30707 |
| 2018/0285599 A1* | 4/2018 | Praveen et al. | G06F 21/62 |
| 2019/0080397 A1* | 3/2019 | Monaco et al. | G06Q 40/02 |
| 2019/0236695 A1* | 8/2019 | McKenna et al. | G06Q 40/02 |
| 2019/0333140 A1* | 10/2019 | Sullivan et al. | G06Q 40/02 |
| 2020/0074539 A1* | 5/2020 | Palaghita et al. | G06Q 40/02 |

* cited by examiner

| Net Income Range (A=Annual, M= Monthly) | AvgMarkUp Percentile = 5% |
|---|---|
| A:[0, 2500) M:[0, 2,083) | 10.0% |
| A:[25,000, 50,000) M:[2,083, 4,166) | 14.0% |
| A:[50,000, 75,000) M:[4,166, 6,250) | 18.0% |
| A:[75,000, 100,000) M:[6,250, 8,333) | 22.0% |
| A:[95000, 100000) M:[7,916, 8,333) | 25.0% |

6100

| Net Income Range (A=Annual, M= Monthly) | AvgMarkUp Percentile = 95% |
|---|---|
| A:[0, 2500) M:[0, 2,083) | 60.0% |
| A:[25,000, 50,000) M:[2,083, 4,166) | 65.0% |
| A:[50,000, 75,000) M:[4,166, 6,250) | 70.0% |
| A:[75,000, 100,000) M:[6,250, 8,333) | 75.0% |
| A:[95000, 100000) M:[7,916, 8,333) | 80.0% |

6200

AUTOMATED RULE-BASED ELECTRONIC TRANSACTION DATA ANALYSIS

TECHNICAL FIELD

The present disclosure generally relates to big data processing systems and their application to automated electronic transaction record analysis. More particularly, the disclosure relates to analyzing electronic transaction records using automated and rule-based techniques driven by data processing systems.

BACKGROUND

The mortgage industry has suffered process inefficiency and lost opportunity, due to inconsistent, inadequate, and ineffective information validation processes and difficulties in ubiquitous enforcement of practices. Some entities, such as lenders, have tightened loan qualification requirements, whereas other entities have implemented internal policies for improving information validation processes for providing information to decision systems within the entity. However, improving information validation processes relies on the accuracy of the information received, and involves the collection of physical documents which are reviewed manually. As an example, lenders determine a borrower's income using pay stubs and other physical documents provided by the borrower, and the determined income is directly used to estimate a borrower's financial capacity to repay a new loan. While traditional techniques may involve electronic copies of these documents, the review process is generally conducted manually, prone to errors and inconsistencies, and is very time consuming for both the borrower and lender. The drawbacks of traditional processes can comprise the accuracy of a borrower's financial capacity, increasing the likelihood of requiring duplicate assessments or delaying the lending process, as well as increased potential for fraud.

As discussed above, traditional techniques rely on manual review by agents of the entity using various physical documents provided by the prospective borrower. The borrower may provide paper copies of pay stubs, W-2 forms, court documents, bank statements, or account statements of financial investments. For example, current practices in the mortgage industry require a borrower to provide three years of income tax returns, as well as in some cases, copies of employer-provided paystubs. The requirement that these documents be provided as physical hard copies often adds significant processing delays for lenders due to the time-consuming nature of requesting documentation and waiting for the borrower to deliver the documentation. Delays such as these typically adds days or weeks to a loan origination timeline, depending on extrinsic factors including the borrower's availability and ability to acquire the necessary document, proactive intervention by lenders, and the extent of involvement required to format the information contained in the documents to a predetermined technological structure or scheme.

Traditional techniques are also limited by various other factors including potential "staleness" of the data, the time-intensive process associated with verifying the accuracy of the documents, the time-intensive process associated with parsing through many of documents, and issues related to inaccurate calculations by the lender. There is also a greater potential for inaccuracies due to fraud associated with the ease of fabricating or altering physical documents. Moreover, attempts to electronically process the financial information received from the borrower have been frustrated by lack of industry standards for reporting and posting transactions to a borrower's account.

Furthermore, the documentation provided often fails to provide reliable insight into a borrower's financial responsibility or capacity to repay a loan. Traditional techniques analyze documentation to determine whether the data supports and is consistent with a gross income reported by a borrower. If verified, the gross income is then used to determine the viability and terms of a given loan or loan application. However, a borrower's gross income may not accurately reflect a borrower's capacity to repay a loan, thus resulting in an inaccurate assessment. For example, two prospective borrowers may independently report a gross income of $65,000. A lender may verify that documentation provided by each borrower supports the reported gross income. However, in reality, a plurality of extrinsic factors may affect each borrower's capacity to repay a loan. Borrower A may receive health insurance through a spouse, while Borrower B pays a family health insurance premium. Borrower A may make no retirement contributions, while Borrower B contributes 20% of each paycheck to a retirement plan. Thus, the net income realized by each borrower may vary substantially based on a number of factors. These factors may greatly affect a borrower's capacity to repay a loan and therefore cannot be accurately represented by a single gross income. That is, under traditional techniques, Borrower A and Borrower B may be assessed the same by virtue of having similar gross incomes, despite the reality that Borrower B may be more likely to default due to poorer spending habits or other debt obligations may not appear on a credit report.

Therefore, a need exists in the lending industry to streamline the income validation process and improve a lender's ability to validate income in order to assess a borrower's capacity to repay a loan. The present disclosure is directed to addressing these and other challenges.

SUMMARY

The embodiments disclosed herein provide for automated and rule-based electronic transaction data analysis, for the purposes of information validation such as for validating a borrower's income within an estimated range. Disclosed embodiments provide numerous benefits over prior systems due to the particular mechanisms involved in the analysis, and the computer-based aspects of the electronic transaction data such as online digital data reflecting transactions associated with a digital account. For example, disclosed embodiments provide for enhanced security and analysis accuracy, by directly receiving electronic transaction data for one or ore accounts associated with a borrower, thereby reducing the chance of fabrication or fraud. Disclosed embodiments also greatly increase the speed of the validation process by receiving electronic data through networked communication links, and performing rules-based analyses on the electronic data, as opposed to the subjective and potentially inconsistent processes of traditional techniques. Furthermore, disclosed embodiments improve upon the accuracy, security, and speed of traditional techniques and traditional systems by using new data analysis techniques and systems for income validation analysis to determine risk-adjusted estimates of gross income for each borrower. In particular, disclosed embodiments receive and process electronic transaction data received from an entity that manages or aggregates the electronic transaction data (such as a bank) without manual or physical intervention, as opposed to traditional systems which involve collecting physical documents. The use of electronic transaction data may provide more information about individual transactions and faster analysis speeds than possible using traditional paper documents, and traditional systems generally use paper documents that contain different information than electronic transaction data.

Disclosed embodiments may be used to estimate a net income at a fixed cadence and estimate a relationship between the net income and gross income. The relationship may be estimated based on historical correlations between net income and gross income. The estimated relationship may be used to determine risk-adjusted estimated gross income. By estimating a net income of a borrower using the calculation techniques and data types disclosed herein, disclosed systems may increase the accuracy in determinations of a borrower's ability to repay a loan, in comparison to traditional systems and techniques that determine gross income using traditional techniques. In the following description, certain aspects and embodiments of the present disclosure will become evident. It should be understood that the disclosure, in its broadest sense, could be practiced using a subset of the features and aspects of disclosed embodiments, and these aspects and embodiments are merely exemplary.

Some disclosed embodiments may involve components and operations described herein and as illustrated in FIG. 1A. In some embodiments, a computer system associated with a mortgage originator may identify a media form of data to be collected. The originator system may generate a request to a data aggregator system, for collecting the data from a data source such as a financial institution. The data source may include a networked database or a networked computer system. In some embodiments, the mortgage originator may directly interface with the data source without the need for a third party data aggregator system.

In some embodiments, the data aggregator system may communicate authorization information received from a prospective borrower to the data source, thereby authorizing the data source to provide transaction information associated with the borrower to the data aggregator. The data aggregator may then generate one or more requests the information from the data source (financial institution). The aggregator system may create and append one or more tags to the received information, such as a code key that uniquely identifies the borrower or a loan application associated with the borrower. The data aggregator may send the created key to the originator system. The originator system may execute an under-writing qualification application, or interface with a separate under-writing qualification system, and send the created key to the under-writing qualification system. The data aggregator system may transmit aggregated transaction data using the created key to the under-writing qualification system. Once the transaction data is received, the under-writing qualification system may extract data points from the transaction data, process the data points in accordance with the particular mechanisms disclosed herein, and generate a range of estimates of the borrower's capacity to repay a certain loan amount.

Using the generated range of estimates, together with other metrics described herein, the under-writing qualification system may generate and output a report about predicted characteristics about the loan and borrower. The under-writing qualification system may provide the generated report to the originator system, for review by a loan officer.

In one exemplary embodiment, a system is disclosed for automated income validation using electronic transaction data. The system may comprise one or more memory devices storing executable instructions and one or ore processors configured to execute instructions to perform operations. The operations may comprise receiving transaction data associated with a financial account of a borrower, wherein the transaction data includes one or more data elements representing one or more income transactions, analyzing one or more characteristics of the one or more data elements, wherein the one or more characteristics includes a transaction description, associating, based on the analysis of the one or more characteristics, an income type label and an income source label with one or more data elements of the set of data elements, identifying a cluster of data elements associated with a first income source label, wherein the identified cluster includes a plurality of data elements associated with a first income type label, verifying the cluster of data elements, wherein the verified cluster represents one more data elements of the identified cluster attributable to the borrower, analyzing cluster data associated with the verified cluster, determining, based on the analyzed cluster data, one or more income streams, calculating, based on a transaction rule associated with the one or more determined income streams, a composite income, determining a net income associated with the first income type, wherein the net income includes the composite income, and generating, based on the determined net income, a gross income distribution.

In another exemplary embodiment, a method is disclosed for automated income validation. The method may comprise receiving transaction data associated with a financial account of a borrower, wherein the transaction data includes one or more data elements representing one or more income transactions, analyzing one or more characteristics of the one or more data elements, wherein the one or more characteristics includes a transaction description, associating, based on the analysis of the one or more characteristics, an income type label and an income source label with one or more data elements of the set of data elements, identifying a cluster of data elements associated with a first income source label, wherein the identified cluster includes a plurality of data elements associated with a first income type label, verifying the cluster of data elements, wherein the verified cluster represents one more data elements of the identified cluster attributable to the borrower, analyzing cluster data associated with the verified cluster, determining, based on the analyzed cluster data, one or more income streams, calculating, based on a transaction rule associated with the one or more determined income streams, a composite income, determining a net income associated with the first income type, wherein the net income includes the composite income, and generating, based on the determined net income, a gross income distribution.

In other embodiments, a non-transitory computer readable medium is disclosed having stored thereon computer-executable instruction for configured the system and performing the methods disclosed herein.

It is to be understood that both the foregoing general description and the following detailed description are exemplary and explanatory only, and are not restrictive of the disclosed embodiments or the claims.

BRIEF DESCRIPTION OF DRAWINGS

The accompanying drawings, which are incorporated in and constitute a part of this disclosure, illustrate several embodiments and, together with the description, serve to explain the disclosed principles. In the drawings.

DETAILED DESCRIPTION

Exemplary embodiments are described with reference to the accompanying drawings. In the figures, the left-most digit(s) of a reference number identified the figure in which the reference number first appears. Wherever convenient, the same reference numbers will be used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the claims.

Figure 1A:
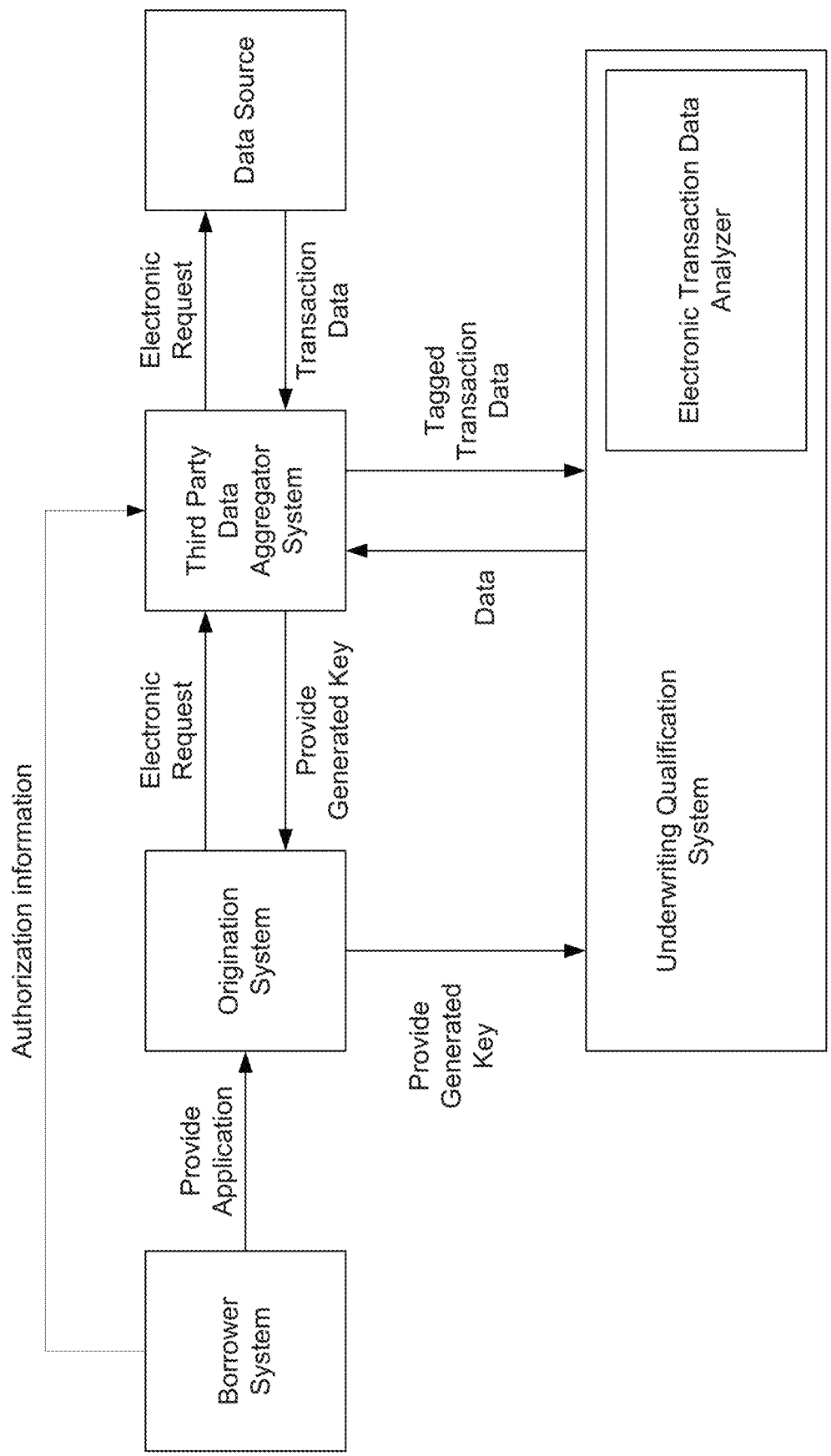
FIG. 1A illustrates an exemplary process and data flow diagram consistent with disclosed embodiments.
Figure 1B:
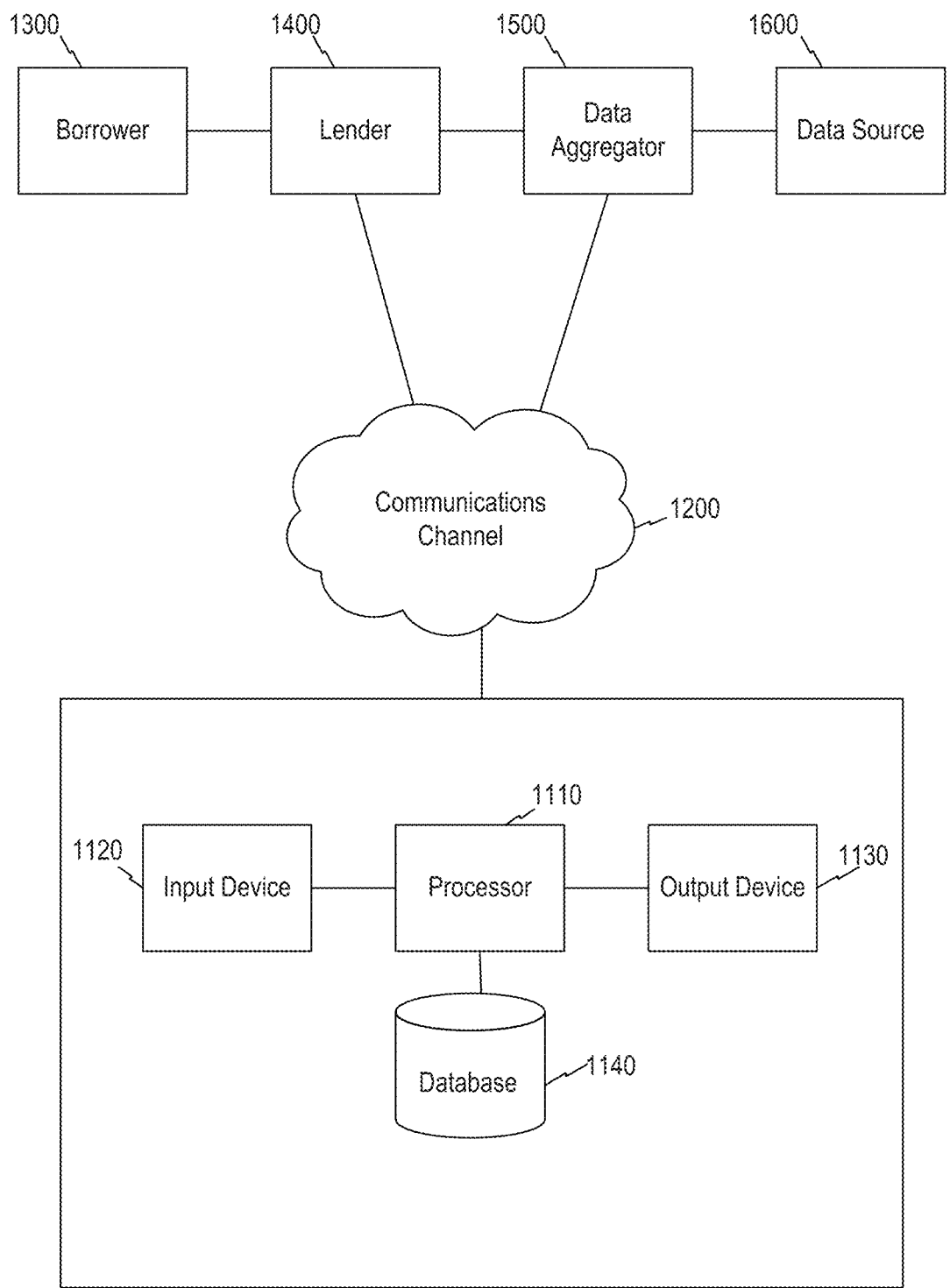
FIG. 1B illustrates an exemplary environment in which the disclosed system may operate consistent with certain disclosed embodiments.

FIG. 1A illustrates an exemplary system 1000 for information validation, such as income validation, which may enable an entity (such as a lender or other financial institution) to determine a net income and a gross income of a borrower associated with a loan or loan application. Referring to FIG. 1A, system 1000 may include a communication channel 1200 operative between one or more lenders 1400, one or more data aggregators 1500, and computing platform 1100. Lender 1400 may be in communication with one or more borrowers 1300 and data aggregator 1500. Data aggregator 1500 may be in further communication with one or more data sources 1600 and borrower 1300. Communication between the various entities may be achieved through a transfer of secure keys, wherein the secure key provides access to secure information. Lender 1400 may include a financial entity, such as a bank, mortgage bank, mortgage broker, mortgage originator, and/or any other entity. Borrower 1300 may include an entity, such as a business or individual consumer, seeking a loan. Borrower 1300 may authorize data aggregator 1500 to collect financial information associated with the borrower. Data aggregator 1500 may include an entity that acts a third-party to the loan and collects data from data source 1600. Data aggregator 1500 may tag the information with a code key (uniquely identifying the borrower and the loan application) and provide the key to lender 1400 and computing platform 1100.

In some embodiments, the data source 1600 may include one or more internal, external, proprietary, and/or public databases, such as financial databases and demographic databases connected to computing platform via communications channel 1200, such as via an Internet connection or other electronic/network connection. In some embodiments, the data sources 1600 may include third party data sources, such as payroll providers, third party providers with direct access to IRS data (e.g., Form 4506T, Form W-2, Form 1099), pay-stub providers, verification of deposit providers, and loan origination system providers. In still some embodiments, system 1000 may extract data from loan origination systems that are integrated with data sources 1600 that provide, for instance, data verification and fraud detection capabilities.

In another embodiment, computing platform 1100 may directly access data from data source 1600, reducing time, data errors, and increasing security, while improving the quality of loan component using enhanced computer systems. Computing platform 1100 may thus reduce reliance on manual review, provide an auditable data trail from origin to receipt, and increase the integrity and security of the data analysis and analysis results. In some embodiments, computing platform 1100 may receive and utilize different types of data than traditional systems, to improve upon the accuracy, speed, and integrity of the process. For example, the receipt and analysis of electronic transaction data may reduce or eliminate the need for traditional physical documents such as pay stubs and paychecks, to verify income information for a borrower. Consequently, system 1000 may increase confidence in the information used and generated in the information validation and loan origination processes.

Communication channel 1200 may include, alone or in any suitable combination, a telephony-based network, a local area network (LAN), a wireless local area network (WLAN), a wide area network (WAN), a dedicated intranet, the Internet, or a cloud computing system. Further, any suitable combination of wired and/or wireless components and systems may be incorporated into communication channel 1200. Although computing platform 1100 may connect to lender 1400 and data aggregator 1500 through communication channel 1200, computing platform 1100 may also connect directly to the lender 1400 and data aggregator 1500. While communication channel 1200 is depicted in FIG. 1A as bi-directional, one or more unidirectional communication links between system components may be used.

Computing platform 1100 may include an entity capable of receiving, processing and providing information to, for example, borrower 1300, lender 1400, data aggregator 1500, and data sources 1600 and/or any other entity authorized to communicate with computing platform 1100. In an exemplary implementation, computing platform 1100 may include processor 1110 such as a PC, UNIX server, a mainframe computer, or distributed computing system for performing various functions and operations. Processor 1110 may be implemented, for example, by a general purpose computer or processor selectively activated or reconfigured by a stored computer program, or may be a specially constructed computing platform for carrying-out the features and operations disclosed herein. Moreover, processor 1110 may be implemented or provided with a wide variety of components or systems including, for example: one or more central processing units, one or more co-processors, memories, registers, and other data processing devices and subsystems. In some embodiments, processor 1110 may be implemented using a distributed computing system such as a cloud computing system having multiple networked processors (e.g. HOFS cluster). Processor 1110 may interface with, or be embedded in, one or more systems (not shown), that provide financial information, credit information, and/or real estate information, such as systems that are used to originate loans, provide appraisals (or value property), and/or provide quality control tools for the mortgage loan process.

Processor 1110 may communicate with input device 1120 and/or output device 1130 using connections or communication links, as illustrated in FIG. 1A. Alternatively, communication between processor 1110 and input device 1120 or output device 1130 may be achieved using a network (not shown) similar to that described above for communication channel 1200. Processor 1110 may be located in the same location or at a geographical separate location from input device 1120 and/or output device 1130 by using shared or dedicated communication links and/or a network.

Input device 1120 may be implemented with a wide variety of components to receive and/or provide information. For example, input device 1120 may include an input peripheral and/or a network interface. The input device may include a keyboard, a mouse, a disk drive, a telephone interface, or any other suitable input device for receiving and/or providing information to processor 1110. The network interface of input device 1120 may facilitate exchange of data between the communication channel 1200 and processor 1110 and may also exchange data between the input device and processor 1110. In one aspect, the network interface may permit a connection to, for example, one or more of the following networks: an Ethernet network, an Internet protocol network, a telephone network, a radio network, a cellular network, or any other network capable of being connected to input device 1120.

Output device 1130 may also comprise a wide variety of components to receive and/or provide information. For example, output device 1130 may include, for example, an output peripheral, and/or a network interface. Output device 1130 may be used to receive information from a processor 1110, provide the information to lender 1400, and/or provide the information to an under-writing qualification system seeking to perform an analysis of borrower 1300's transaction data with respect to a loan or loan application. The network interface of output device 1130 may facilitate exchange of data between the processor 1110 and communication channel 1200 and may also exchange data between processor 1110 and the output device of output device 1130. In one aspect, the network interface may permit a connection to, for example, one or more of the following networks: an Ethernet network, an Internet protocol network, a telephone network, a radio network, a cellular network, or any other network capable of being connected to output device 1130.

Database 1140 may store information including financial information, demographic information, real estate information, credit information, algorithms, and other public and/or proprietary information that is kept within an entity or organization. For example, the database 1140 may store information received from data source 1600. Although database 1140 is shown in FIG. 1A as being located with processor 1110, the database may be located elsewhere (or in multiple locations) and connected to computing platform 1100 via direct links or networks.

In another aspect, the system may interface with various other systems, or may be implemented as a component of other systems, including multiple data sources 1600; systems that provide end users interfaces, for instance, for viewing or responding to the validation data, or for adding credit policy overlays; systems for storing the loan data, for instance, in a secure e-vault such as in database 1140.

Figure 2:
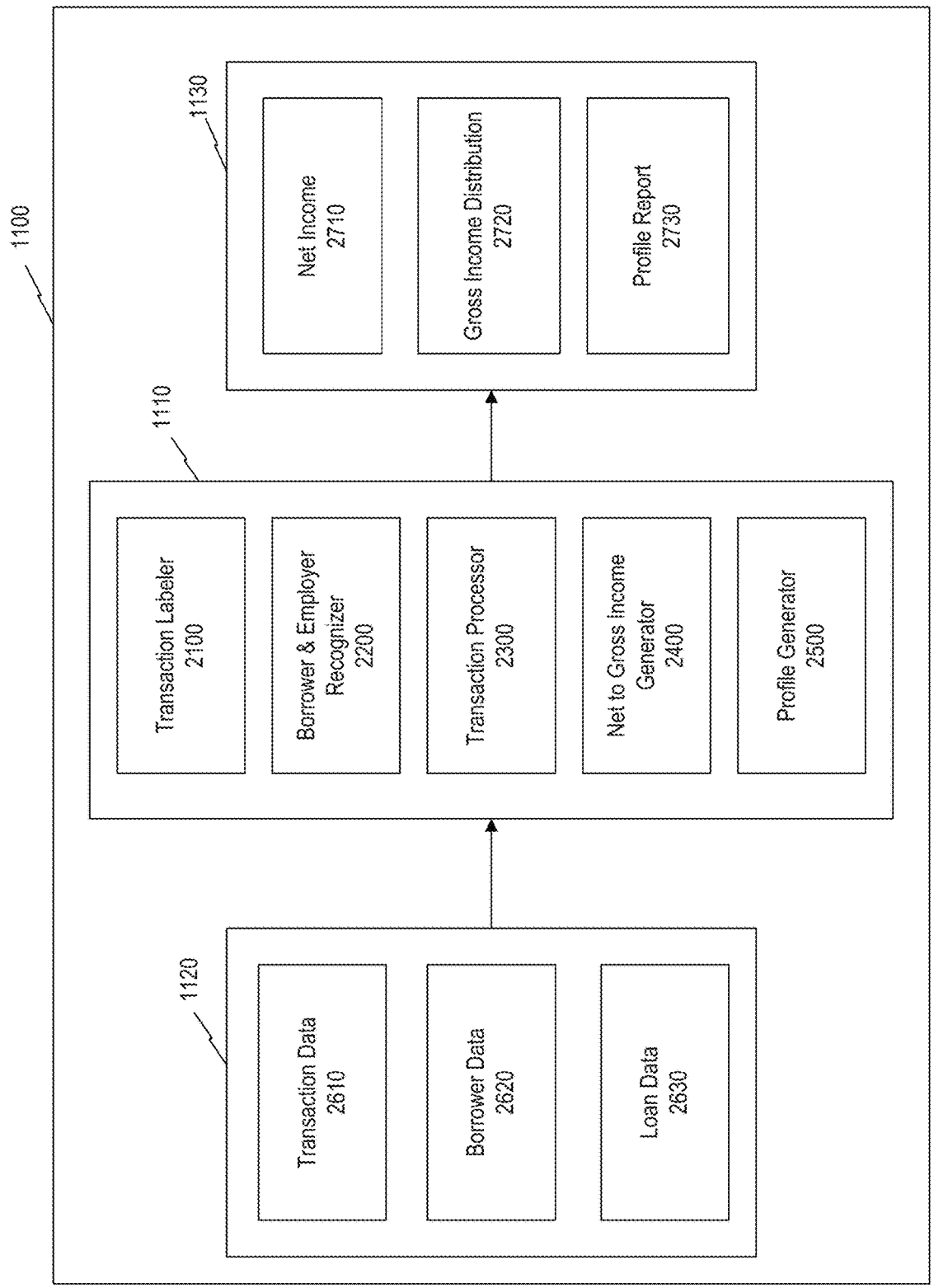
FIG. 2 illustrates a platform for an exemplary computing platform consistent with certain disclosed embodiments.

FIG. 2 illustrates computing platform 1100 depicting various component of an income validation process. Computing platform 1100 may include processor 1110 in communication with input device 1120 and output device 1130 via one or more network interfaces consistent with disclosed embodiments.

Processor 1110 may be configured to process information electronically for determining a net income or gross income of borrower 1300. The processed information may include transaction data 2610, borrower data 2620, and/or loan data 2630 may be secured and/or tagged with a unique identifier associated with borrower 1300. Transaction data 2610 may include electronic transaction data for an account associated with borrower 1300. For example, transaction data may include transactions for a bank account in the name of borrower 1300. In some embodiments, transaction data 2610 may also include digitized documentation associated with one or more financial statements, paystubs, receipts financial, loan property images, and/or tax forms. Borrower data 2620 may include additional supplemental and personal information related to borrower 1300. For example, borrower data 2620 may include a full legal name, and/or an employment verification form. Loan data 2630 may include information related to a loan or loan application associated with borrower 1300. For example, loan data 2630 may include a borrower-declared gross income, one or more loan terms of a loan application, and/or one or more proposed loan terms of an existing loan related to a loan modification request.

In some embodiments, processor 1110 may receive the information related to transaction data 2610, borrower data 2620, and/or loan data 2630 from input device 1120. Processor 1110 may receive, via communication channel 1200, a unique identifier associated with borrower 1300 and/or a security key authorizing access to secure information. Processor 1110 may transmit the unique identifier or security key to input device 1120. Upon receiving the unique identifier or security key from processor 1300, input device 1120 may transmit the received data associated with borrower 1300 to processor 1110 for processing.

In some embodiments, processor 1110 may transmit the unique identifier or security key to input device 1120. Upon receiving the unique identifier or security key from processor 1300, input device 1120 may retrieve the transaction data, borrower data, and/or loan data from database 1140 using the unique identifier or security key. Still in some embodiments, processor 1110 may receive the unique identifier or security key from input device 1120 and transmit the received unique identifier to database 1140 for retrieving the transaction data, borrower data, and/or loan data.

Processor 1110 may be configured to execute instructions for processing the received information. The executable instructions may be associated with one or more software applications executed by processor 1110. In some embodiments, processor 1110 may include transaction labeler 2100, borrower and employer recognizer (BER) 2220, transaction processor 2300, net to gross income (NGI) generator 2400, and profile generator 2500. In some embodiments, processor 2100 may include some or all of the disclosed. Although transaction labeler 2100, BER 2220, transaction processor 2300, net to gross income 2400, and profile generator 2500 are shown in FIG. 2 as being located with processor 1110, one or more of the software applications may be executed by one or more processors in a different location (or in multiple locations) and connected to computing platform 1100 or system 1000 via direct links or networks.

Figure 3A:
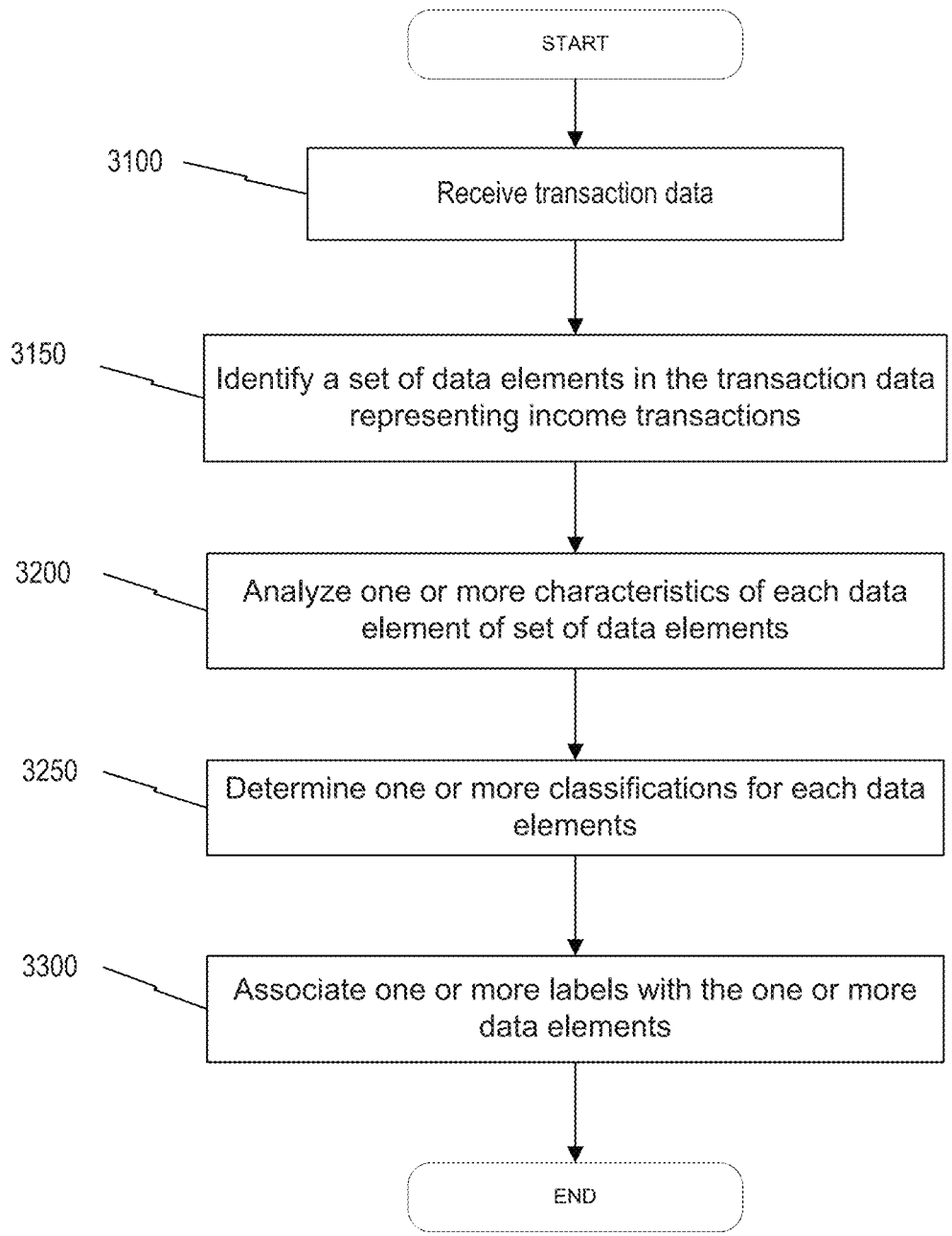
FIG. 3A illustrates an exemplary flowchart for labeling transaction data consistent with certain disclosed embodiments.

FIG. 3A illustrates an exemplary flowchart for a process 3000 for processing transaction data 2610.

System 1000 may use the process of FIG. 3 to analyze transaction data 2610 received from input device 1120 and transmit a result of the analysis to BER 2200 or transaction processor 2300. For example, computing platform 1100 may perform an analysis of transaction data 2610 to identify features of the transactions that may be relevant for income validation.

In some embodiments, process 3000 may proceed by identifying income sources, estimating monthly income amounts and cadence from received transaction data, cross-checking transaction data against loan application data and checking entities of the borrower and borrower's employer(s), estimating monthly gross income, and generating an assessment report based on the estimated gross income. These steps are described in further detail below.

In some embodiments, steps of process 3000 may proceed in an automated fashion, following inputs received from a user such as borrower 1300. For example, processor 1110 may automatically generate requests for transaction data from one or more networked sources, receive and analyze the transaction data in an automated fashion without the need for manual intervention, and generate one or more outputs such as a report based on rules and computer models disclosed herein. The particular mechanisms and potential ordered combinations of steps involved are described herein.

At step 3100, processor 1110 may receive transaction data 2610 from input device 1120. Transaction data 2610 may include credit and debit transactions associated with one or more financial accounts. Each transaction may include information including one or more of the following: an identification of a financial institution name involved in the transaction, an account number of the financial account, a timestamp for the transaction (i.e. date and time), a transaction description provided, an amount of the transaction, a type of transaction (credit or debit), and/or a vendor-identification for the transaction.

The format of transaction data 2610 may be extended to any digital structured, semi structured, or unstructured form (e.g., database tables, data in xml or other "flat" forms, data lakes, text, audio and images.). In some embodiments, the data received from input device 1120 may also include payroll data electronically obtained directly from third-party payroll processing providers (ex. ADP), and/or electronic W-2 via flat file transmission and streaming.

At step 3150, processor 1110 may identify a set of data elements in the transaction data representing income transactions. Step 3150 may include mining data received at step 3100 in order to identify transactions that may fit within one of a plurality of predetermined classifications of income. In some embodiments, transactions that represent income may be classified into one of a plurality of categories using a machine learning model such as a Random Forest model. The categories may include, for example, "Payroll," "Social Security," "Child Support," "Alimony," or "Pension." The source of the income transaction may also be identified using a text-pattern matching algorithm.

In some embodiments, processor 1110 may identify the set of data elements based on a characteristic of one or more data elements distinguishing the data elements as income transaction. The distinguishing characteristic may include a predetermined feature or aspect of the transaction data associated with identifying a transaction as an income transaction, or associated with differentiating income transactions from deposit or expense transactions. In some embodiments, processor 1110 may query the transaction data based on one or more predetermined patterns associated with income transaction including "+" or "deposit". In such embodiments, processor 1110 may parse strings of information in the received transaction data, and apply one or more sets of predefined rules to the parsed information. For example, processor 1110 may identify separate words or groups of characters based on the detection of spaces in transaction data, and compare the words/groups of characters to a predefined set of words and characters such as "deposit," "payroll," and other elements previously determined to be associated with an income stream. Such previously-determined elements and rules maybe included within a computer model that is updated on an ongoing basis, as described above.

In some embodiments, processor 1110 may parse received transaction data for textual pattern matching purposes. As a non-limiting example, processor 1110 may generate n-grams of the transaction data information. In such embodiments, processor 1110 may step through a predetermined number of n-gram levels, or a number of n-gram levels determined based on a total length of the transaction data information, and generate n-grams for each level. For example, processor 1110 may set a first n-gram level to n=2, and generate a list of "words" having two consecutive characters, for the entire length of the transaction data information. As another example, if the transaction data information is "John Doe payroll," processor 1110 may generate n-grams with n=3 of "Joh," "ohn," "hn_," "n_D," "_De," "Doe," "e_p," "_pa," "pay," "ayr," "yro," "rol," and Processor 1110 may then compare each of these grams against a predefined group of words or characters to detect a match. As another example, if processor 1110 sets n=6, the corresponding n-grams may include "John_D," "ohn_Do," "hn_Doe," "n_Doe_," . . . and "payroll." Processor 1110 may then compare these grams to a set of predefined words, which may include "payroll," as this word may be previously determined to be associated with an income stream. Upon performing the comparison, processor 1110 may determine that this string of information is likely associated with an income stream because it contains the word "payroll" matched in the n-grams.

In some embodiments, transaction processor 1110 may analyze metadata associated with each of the data elements in the received transaction data, in lieu of or in addition to parsing the information. In such embodiments, processor 1110 may determine whether funds were received or withdrawn from the account based on one or more metadata indicators of deposit or withdrawal. Processor 1110 may further filter transaction data 2610 based on a transaction amount. For example, processor 1110 may apply a predetermined rule associated with identifying the set of data elements wherein data elements with transaction amounts less than or equal to $0.01 are excluded from the set of data elements representing income transactions.

At step 3200, processor 3200 may analyze one or more characteristics of the set of data elements. The one or more characteristics may include a transaction description, a transaction date, an account type, a transaction channel (e.g., ACH transaction, ATM transaction, wire transfer, etc.), and/or a transaction amount. For example, processor 1110 may employ a multiclass classification technique and/or a text mining technique to analyze the characteristics.

Processor 1110 may also apply a predetermined set of rules for text mining to analyze characteristics of the income transaction. In some embodiments, a text mining technique may be applied to a free-form text field to perform necessary data transformations and feature engineering. A string of test may be converted to a matrix of token counts. The token count may be used to determine a confidence rating associated with a predetermined rule. Processor 1110 may tokenize a transaction description string and generate an integer identification for a plurality of tokens of varying window sizes, similar to the description of n-grams above. Processor 1110 may count the occurrences of tokens in each string and normalize the token count. A sequence of characters in the string matching each token may be mapped to input features indicating the presence of respective sequences. Processor 1110 may also apply a term weighting to account for term frequencies and/or inverse document frequencies to account for term sequences not likely to provide valuable information related to the income transaction. Processor 1110 may be developed and train one or more computer models comprising a predetermined rule set using transformed features as inputs. In some embodiments, one or more computer models may be trained and updated using a system for analyzing trends in historical loan and loan application data, to identify a correlation between features of transaction data and the correct identification of an income stream transaction. In some embodiments, the trained computer models may comprise a set of predetermined rules that are updated on a continuous or periodic basis, for instance, in response to receiving additional data, to improve the automated detection of income transactions and income streams in electronic transaction data.

In some embodiments, processor 1110 may analyze the representation of an entity name, an individual name, and/or an amount in the transaction description. Processor 1110 may rely on entity extraction techniques, computer grammars, or Regular Expressions (RegEx) to analyze characteristics of the data elements based on predetermined text patterns.

In some embodiments, processor 1110 may employ one or more classification techniques including a transformation to binary, a hierarchical classification, or an extension from binary. Processor 2100 may also train one or more algorithms from analyzing one or more characteristics using neural networks, decision trees, k-nearest neighbors, Naïve Bayes, and other mechanisms for classifying and recognizing characteristics in the transaction data. In some embodiments, an extension from binary approach may be employed using a random forest technique to analyze a multifaceted data set. In some embodiments, the one or more characteristics may be analyzed using the random forest using independent decision trees. Each decision tree may be associated with a bootstrap sample of a random subset of features. A random sampling scheme of the features may be used to reduce the correlation between the trees in the forest and average all the decision trees to reduce the variance of an algorithm applying the technique.

At step 3250, processor 1110 may determine one or more classifications for the data elements based on the analysis of step 3200. Processor 1110 may determine a classification for one or more categories including an income type, an income source, a recipient name, a transaction date and/or a transaction amount. The classification may be determined based on a list of predetermined labels for each category. For example, in some embodiments, processor 1110 may, based on an analysis of characteristics of a data element, determine a classification for an income type of the income transaction. Processor 1110 may access a list of predetermined labels for income type, wherein the income type includes one of a payroll payment, a social security payment, a pension payment, an alimony payment, or a child support payment. In some embodiments, processor 1110 may determine a classification for an income source. Processor 1110 may determine the income source based on detecting a match between a string of characters in transaction description and an employer name provided in an employment verification form or other income sourced declared and verified by system 1000. In some embodiments, processor 1110 may compare a plurality of analyzed characteristics to identify similarities between or more data elements. For example, processor 1110 may determine income source "S BRUNSWICK" for a first data element and income source "SOUTH BRUNSW" for a second data element. Based on analysis techniques described above and a predetermined set of rules for determining income source classifications, processor 1110 may determine classify first and second income sources according to a classification representing "SOUTH BRUNSWICK." Furthermore, additional data processor 1110 may determine a "SOUTH BRUNSWICK" classification for additional data elements based on a detection of similar transaction characteristics such as a source identification number matching a source identification number of "S. BRUNSWICK" and "SOUTH BRUNSW."

At step 3300, processor 1110 may associate, one or more labels with one or more data elements. The labels may be generated and/or retrieved based on the classification determined at step 3250. One or more labels may be selected from a plurality of labels stored in database 1140. For example, in some embodiments, wherein processor 1110 may be configured to generate metadata associated with the determined classification and tag the data element with the metadata. In some embodiments, processor 1110 may generate a data table representing the categories of classifications for each data element and populate the data table with one or more labels representing the determined classification.

Figure 3B:
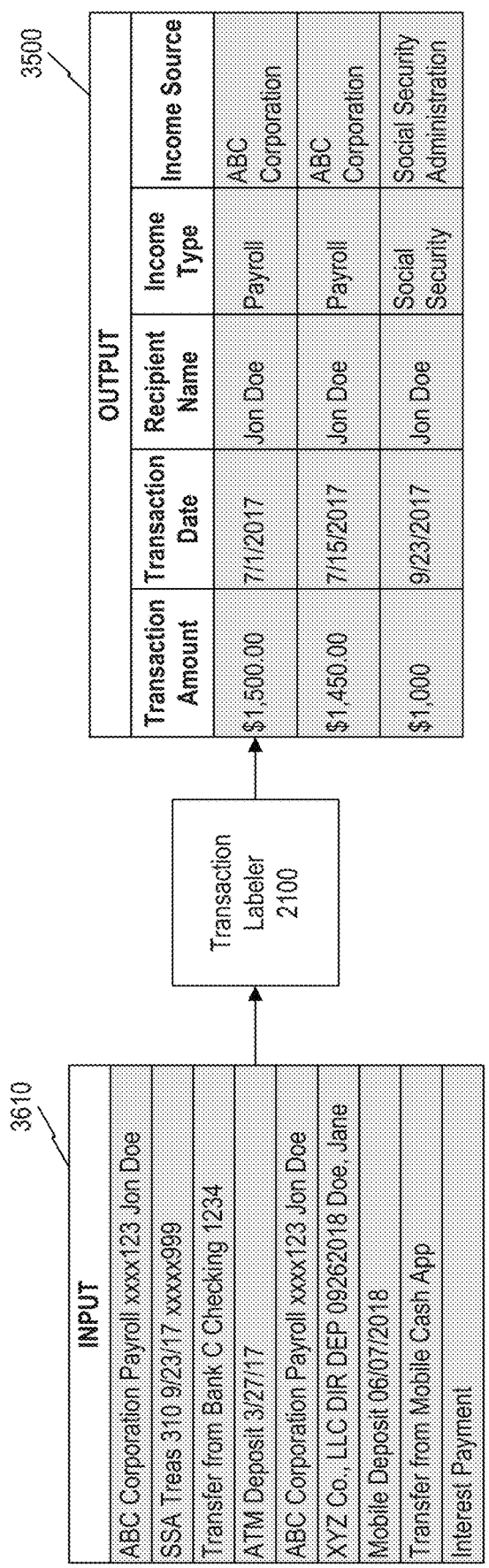
FIG. 3B illustrates exemplary process for labeling transaction data consistent with certain disclosed embodiments.

FIG. 3B illustrates an exemplary process for generating labeled data elements using the process of FIG. 3A. Transaction labeler 2100 may receive transaction data 3610. Transaction data 2610 may include one or more data elements associated with a financial account of a borrower. Transaction labeler 2100 may execute instructions for performing process 3000 described in FIG. 3A to generate labeled transaction data set 3500. For example, transaction labeler 2100 may identify a set of data elements representing income transactions included in transaction data 3610, analyze one or more characteristics of the transaction description of each data element of the set of data elements, determine one or more classification for each data element, and associate one or more label with the one or more data elements.

The one or more labels associated with each data element may represent a classification determined based on the analyzed characteristics. For example, first data element of labeled transaction data set 3500 may represent a payroll deposit from ABC Corporation in the amount of $1,500.00 on Jul. 1, 2017. Income type label "Payroll" and income source label "ABC Corporation" may be associated with the first data element for further processing by processor 1100. Transaction labeler 2100 may analyze one or more characteristics of the transaction description to determine classifications representing the labels associated with the data element. Furthermore, the analyzed characteristics may be distinguished over the characteristics of a third data element of labeled transaction data set 3500. The third data element may be associated with income source label "Social Security Administration." based on analyzed characteristics consistent with a predetermined rule for identifying a social security deposit.

Processor 1100 may be further configured to attempt verification of one or more data elements as attributable to borrower 1300. In some embodiments, verification may include matching transaction data and with information provided in a loan application. Matching the information may include determining a recipient of the income and a source of the income is similar or identical to a borrower name and an employer name associated with an income stream identified in a loan application. In some embodiments, processor 1100 may determine whether an income source identified in the transaction data, and an employer name listed in the corresponding loan application match. A pattern matching algorithm, such as a customized version of a Smith-Waterman Sequence Alignment algorithm, may be used to determine a matching or alignment of a text subsequence between the texts of the two names. A known machine learning model, such as a Random Forest model, may use information from a plurality of borrowers may be used to determine the best overall matching between income source names and employer names.

In some embodiments, verification may be achieved using borrower and employment recognizer (BER) 2200 to prevent potential income transactions in transaction data 2610 from being improperly attributed to borrower 1300. For example, absent verification by BER 2200, one or more income transactions attributed to a joint owner of a financial account but who is not a party to a loan application may inadvertently be included in income attributed to borrower 1300. Thus, to prevent improper inflation of a borrower's income and thus an erroneous estimation more income transactions are in fact attributable to borrower 1300.

One or more data elements may be determined to be attributable to borrower 1300 if the borrower is the intended beneficiary of the income transaction. In some embodiments, BER 2220 may attempt verification of all income transaction received by a financial account as attributable to the borrower where only one borrower is associated with a loan or loan application. BER 2200 may analyze one or more characteristics of the financial account with borrower data 2620 such as a date of birth or a social security number associated with borrower 1300. If BER 2200 determines a match, BER 2200 may verify all income transaction received by the financial account as attributable to the borrower.

In some embodiments. BER 2200 may attempt verification of one or more data elements based on detecting a match between one or more characteristics of a data element and at least one of a borrower name and/or employment information associated with a borrower. Moreover, BER 2200 may aggregate historical match data between income sources and employer names for a plurality of borrowers to determine a confidence rating for the detected match. For example, BER 2200 may analyze one or more characteristics of one or more data elements in transaction data 3610. BER 2200 may determine that the data element represented by transaction description "XYZ Co., LLC DIR DEP 09262018 Doe, Jane" is not attributable to borrower "Jon Doe." The failed verification attempt may be based on a determination that "Doe" matches a borrower last name but that "Jane" does not match borrower first name "Jon." The failed verification attempt may also be based on an additional or alternative determination that neither "XYZ Co., LLC" or "09262018" match an employer name or employee identification number associated with borrower information indicated in borrower data 2620.

Still, in some embodiments, BER 2200 may attempt verification of one or more data elements based on determining whether one or more labels associated with each data element matches one or more characteristics of borrower 1300. For example, BER 2200 may determine whether a recipient name label associated with the data element matches one or more names of borrower 1300 and/or whether an income source label associated with a data element matches an employer name provided in borrower data 2620. If BER 2200 determines a match, BER 2200 may verify that the data element is attributable to the borrower. Additionally, BER 2200 may verify an income transaction based on a unique income type. For example, BER 2220 may identify one or more data elements associated with an income type label "Social Security." BER 2200 may determine that "Jon Doe" was the sole borrower among multiple borrowers associated with a loan application that declared social security payments as a source of income. Based on determining a match between the unique income type label and borrower data associated with "Jon Doe", BER 2200 may verify that the one or more data elements associated with income type label "Social Security" is attributable to borrower "Jon Doe." Transaction labeler 2100 may thereafter associate recipient name label "Jon Doe" with the one or more data elements.

Figure 4A:
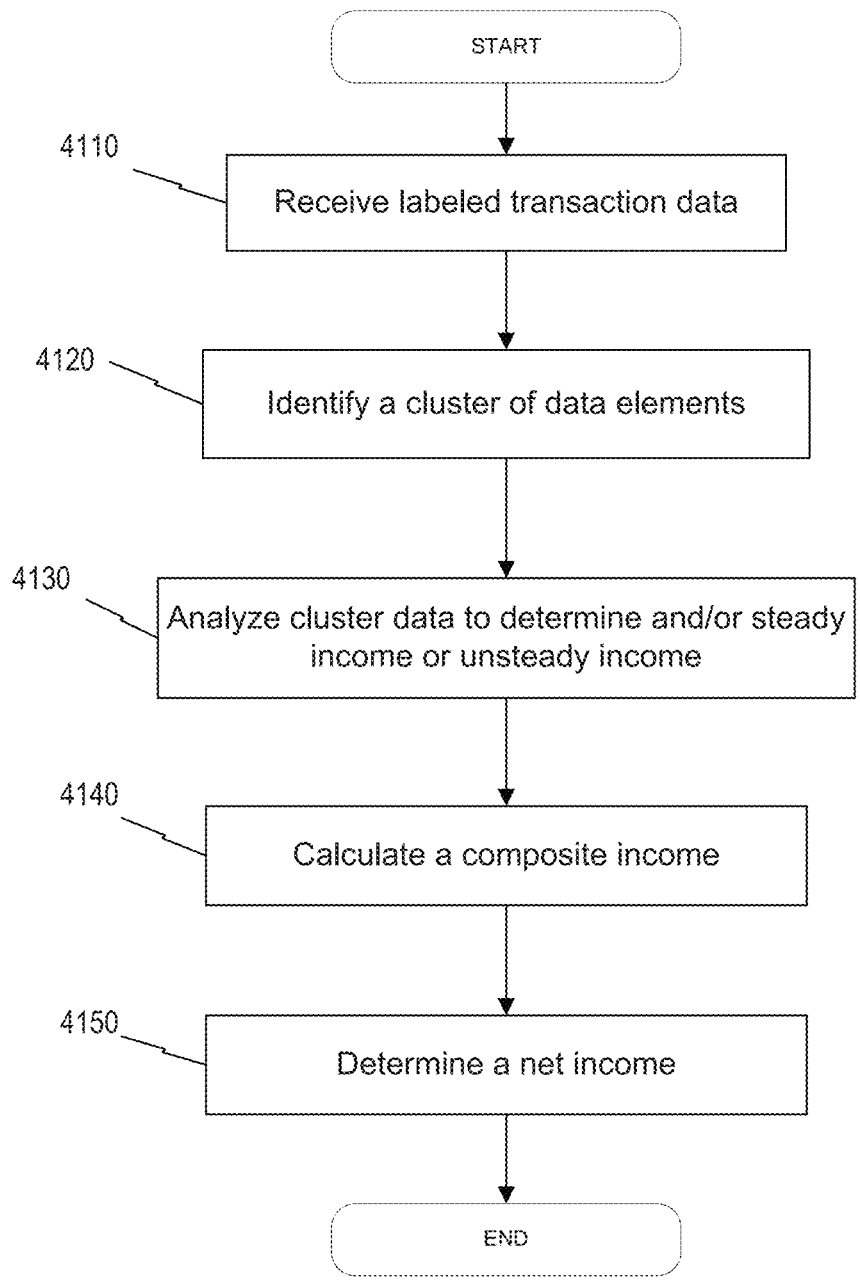
FIG. 4A illustrates an exemplary flowchart for analyzing labeled transaction data consistent with certain disclosed embodiments.

FIG. 4A illustrates an exemplary flowchart 4100 for analyzing one or more labeled data elements for determining a net income. Processor 1110 may be configured to execute instructions using transaction processor 2300 to calculate net income 2710. In some embodiments, the calculated net income may comprise an estimated monthly net income.

At step 4110, processor 1110 may receive labeled transaction data. In some embodiments, transaction processor 2300 may receive the labeled transaction data attributable to borrower 1300 from transaction labeler 2100, BER 2200, and/or input device 1120. Processor 1110 may generate one or more tables based on an analysis of the received labeled transaction data. The one or more tables may include a borrower table, an income table, an employer table, an account table and/or a transaction table. The borrower table may represent one or more borrowers attributable to the on the loan or loan application and may include a borrower identification number, a borrower's first name, and a borrower's last name. The income table may represent one or more income types that a borrower declares and may include the borrower identification number, the borrower first name, the borrower last name, the income type, a declared gross monthly/annual income attributable to the borrower for each income type. Income type values may include "Base," "Bonus," "Commission," "Overtime." "General Payroll," "Social Security," "Pension," "Alimony," or "Child Support." Processor 1110 may also be configured to identify one or more owners associated with a financial account and/or one or more owners of the financial account. Processor 1110 may also be configured to output an indication of insufficient data if one or more required field of the one or more tables are not populated.

At step 4120, processor 1110 may identify a cluster of data elements. Processor 1110 may analyze the received labeled transaction data and/or the one or more tables generated based on the received transaction data to detect one or more data elements attributable to a first borrower, including a first income type label, and a first income source label. Processor 1110 may identify one or more data elements belonging to a first cluster based on a comparison of one or more labels associated with a first data element and one or more labels associated with a second data element. If processor 1110 detects a match, first and second data element may form a first cluster. In some embodiments, a plurality of data elements associated with labels identifying a first borrower, a first income type label, and a first income source label may represent a first cluster of data elements. For example, processor 1110 may identify a first cluster of data elements, wherein the cluster of data elements includes a plurality of data elements corresponding to borrower "Jon Doe," a "Payroll" income type label, and an "ABC Corporation" income source label. A second cluster of data elements may include a plurality of data elements corresponding to borrower "Jon Doe," a "Social Security" income type label, and a "Social Security Administration" income source label. Processor 1110 may be further configured to determine that one or more data elements belong to a first cluster despite an exact match of labels. For example, in some embodiments, processor 1110 may determine that a data element associated with "Jon Doe," a "Payroll" income type label, and an "ABC Corp." income source label belongs to the same cluster as a data element associated with "Jon Doe," a "Payroll" income type label, and an "ABC Corporation" income source label.

Processor 1110 may be further configured to determine whether to further analyze the identified cluster based on whether a sufficient number of data elements have been identified as belonging to a cluster and/or a total income associated the cluster. The determination may be based on a predetermined rule for processing the cluster. The identified cluster may represent an income stream and may include one or more data elements of a steady stream and/or an unsteady stream. Still further, processor 1110 may be configured to aggregate one or more data elements of the identified cluster associated with the same transaction for further processing.

Processor 1110 may estimate a monthly net income and/or a cadence for each source identified at step 3150, using labeled transaction data. In some embodiments, a group of transactions may be identified as "steady." A "steady" transaction may be one that varies by an amount that is less than a predetermined threshold. The variance may be determined using statistics and unsupervised learning such as clustering techniques. For each income source and an associated "steady" transaction, a cadence may be estimated within a maximal variance allowed by a predetermined threshold policy. In some embodiments, cadence may represent a time-based frequency at which transactions occur, such as weekly, bi-weekly, or monthly. Cadence may be determined using statistics and unsupervised learning such as clustering techniques. The group of transactions identified as "steady" and a determined cadence may be used to estimate a steady monthly net income. The steady monthly net income may be estimated using known quantitative methods. A variable, or "unsteady" income may also be identified for each income source based on a group of transaction not included in the group of "steady" transactions and/or having a cadence outside of the maximal variance allowed by the predetermined threshold policy. In some embodiments, the unsteady income may be determined using statistics and unsupervised learning such as clustering techniques.

At step 4130, processor 1110 may analyze cluster data to determine a steady income and/or an unsteady income. Net income may comprise the determined steady income, while a variable income may comprise the unsteady income. Cluster data may include data associated with the one or more data elements of the identified cluster. Processor 1110 may determine a cadence and a dollar steadiness of the cluster data. Based on one or more characteristic of each of the one or more data elements of the identified cluster, processor 1110 may determine whether to add the data element to one of a steady stream or an unsteady stream. Processor 1110 may further determine a steady stream type and an unsteady stream type.

Figure 4B:
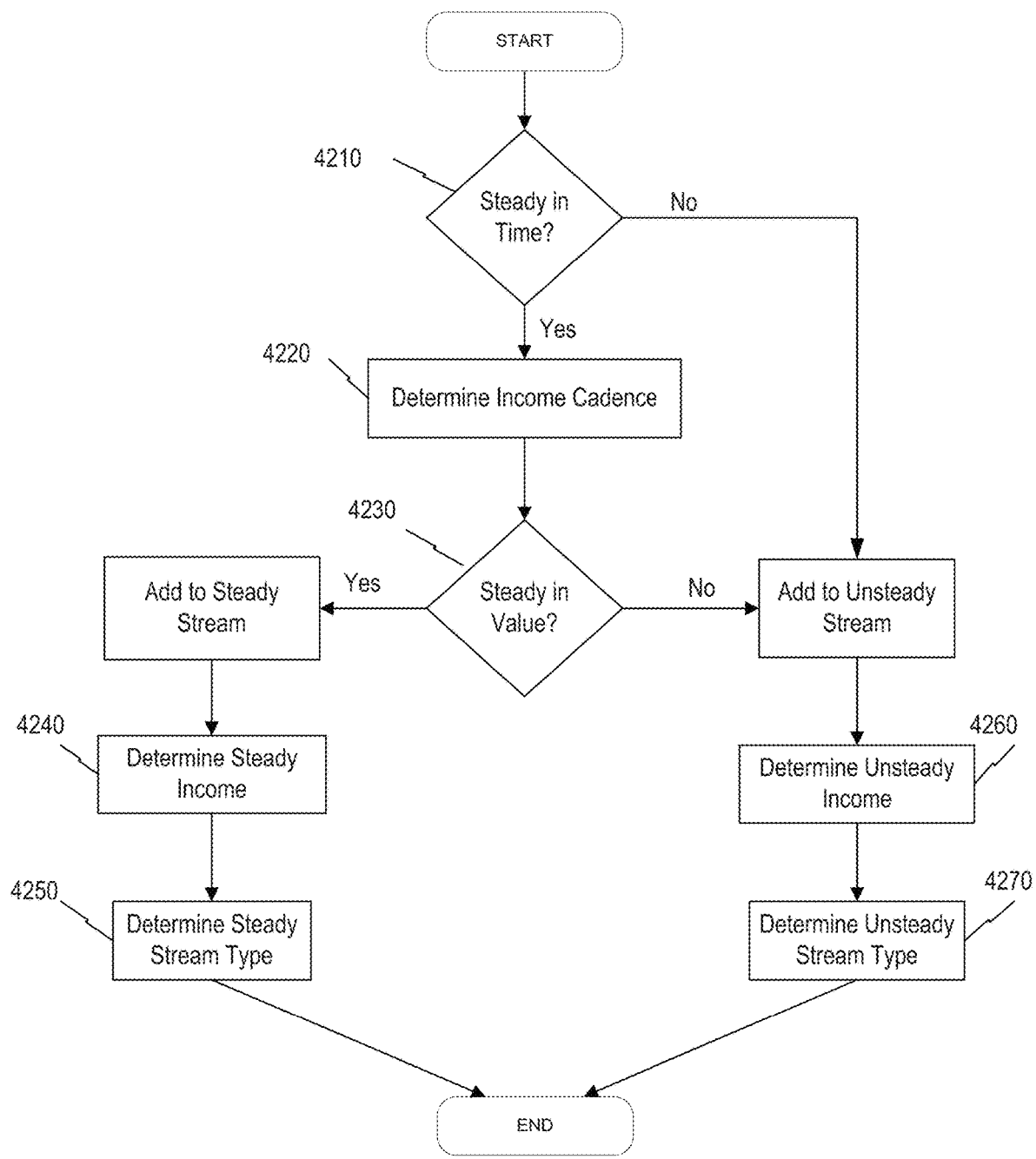
FIG. 4B illustrates an exemplary flowchart for analyzing cluster data consistent with certain disclosed embodiments.

FIG. 4B illustrates an exemplary flowchart 4200 for analyzing the cluster data.

At step 4210, processor 1110 may determine a cadence of the cluster data. Cadence may represent a distribution of a number of days between consecutive income transactions of the identified cluster. A Time Relative Standard Deviation (TRSD) metric may be used to represent variations in the distribution. Processor 1110 may analyze the number of days between each income transaction and determine the TRSD by calculating a standard deviation of the distribution and dividing by a mean of the distribution. A TRSD of 0 may indicate no variations in the number of days between each income transaction. Processor 1110 may determine, according to a predetermined TRSD rule setting as TRSD threshold, that income stream having a TRSD less than the TRSD threshold is time-steady while an income stream having a TRSD greater than or equal to the TRSD threshold is not time-steady. TRSD threshold may represent a credit policy reflecting a risk appetite for a lender associated with a borrower. Processor 1110 may further analyze the cadence associated with each income transaction based on a comparison of the number of days between the income transaction and a preceding income transaction. Processor 1110 may assign one or more income transactions consistent with the median cadence to a time-steady stream.

Processor 1110 identify a gap between one or more income transactions. Processor 1110 identify a gap based on a determination the number of days between a first and second income transaction is greater than the cadence of other income transactions in the stream by a multiple factor. The gap may represent a missed income transaction.

In some embodiments, processor 1110 may identify an outlier income transaction based on a determination of the number of days between a first and second income transaction which is less than the cadence of other income transactions in the stream by a multiple. The outlier income transaction may represent extra payment. Processor 1110 may assign the outlier income transaction to an unsteady stream and recalculate TRSD for the remaining income transactions.

At step 4220, processor 1110 may determine an income cadence. Processor may determine the income cadence based on a predetermined rule associated with a time-steady stream. For example, processor 1110 may determine a weekly income cadence based on a measured mean cadence of less than a predetermined number of days. In some embodiments, processor 1110 may determine a monthly income cadence based on a measured mean cadence of between a first predetermined number of days and a second predetermined number of days.

At step 4230, processor 1110 may determine a dollar steadiness of the cluster data. Dollar steadiness may represent a distribution of value of income transactions of the identified cluster. A Dollar Relative Standard Deviation (DRSD) metric may be used to represent variations in the distribution. Processor 1110 may analyze the value of each income transaction and determine the DRSD by calculating a standard deviation of the distribution and dividing by a mean of the distribution. A DRSD of 0 may indicate no variation in the value of each income transaction. Processor 1110 may determine, according to a predetermined DRSD rule setting as DRSD threshold, that income stream having a DRSD less than the DRSD threshold is dollar-steady while an income stream having a DRSD greater than or equal to the DRSD threshold is not dollar-steady. Processor 1110 may further analyze the dollar value associated with each income transaction based on a comparison of the dollar value of an income transaction and a preceding and/or subsequent income transaction. Processor 1110 may assign one or more income transactions consistent with the median value and assigned to a time-steady stream to a steady stream.

Processor 1110 may identify an outlier income transaction based on a determination the dollar value of a first and second income transaction is inconsistent with a mean dollar steadiness value by a predetermined difference threshold. Processor 1110 may process the outlier income transaction to determine a steady value for the remaining outlier income transaction. For example, in some embodiments, processor 1110 may determine a dollar steady value of $2,000 and identify an outlier income transaction with a dollar value of $3,270. Processor 1110 may impute $1,000 of the $3,270 to the steady stream and assign the remaining $2,270 to an unsteady stream.

At step 4240, processor 1110 may determine a steady income. The steady income may be based on an analysis of the one or more transactions assigned to the steady stream at steps 4210-4230. The steady income may be based on a monthly income calculation based on a base income value equal to a mean value of the income transaction assigned to the steady stream times the number of income transactions in the identified cluster during a predetermined period of time.

At step 4250, processor 1110 may determine a steady stream type. Processor 1110 may determine whether a steady stream type is active or inactive. Processor 1110 may determine that a steady stream is inactive based on a measured period of time between a most recent income transaction assigned to the steady stream being greater than a threshold period of time. Processor 1110 may determine that a steady stream is active based on a measured period of time between a most recent income transaction assigned to the steady stream being less than the threshold period of time.

At step 4260, processor 1110 may determine an unsteady income representing variable net income. The unsteady income may be determined by classifying the one or more income transactions assigned an unsteady stream as one of a negative unsteady income transaction (i.e. deposits with transaction values less than an amount prescribed by a predetermined threshold) or a positive unsteady income transaction (i.e. deposits with transaction values greater than an amount prescribed by a predetermined threshold). To determine the unsteady income, processor 1110 may aggregate negative unsteady values and positive unsteady value for a predetermined period of time.

At step 4270, processor 1110 may determine an unsteady stream type. Processor 1110 may identify an unsteady stream type of one or more income transactions assigned to an unsteady income stream based on an income type declared by the borrower. For example, in some embodiments, the unsteady stream type may be determined to be "commissions." In some embodiments, processor 1110 may determine an unsteady stream type of the one or more positive unsteady transaction as one of "overtime," or "bonus," based on one or more indication by the borrower and identifying the income type of the cluster as "Payroll." The unsteady stream type may be used to determine which rule of a set of predetermined unsteady income rules should be applied for calculating a composite income at step 4140 below.

Figure 4C:
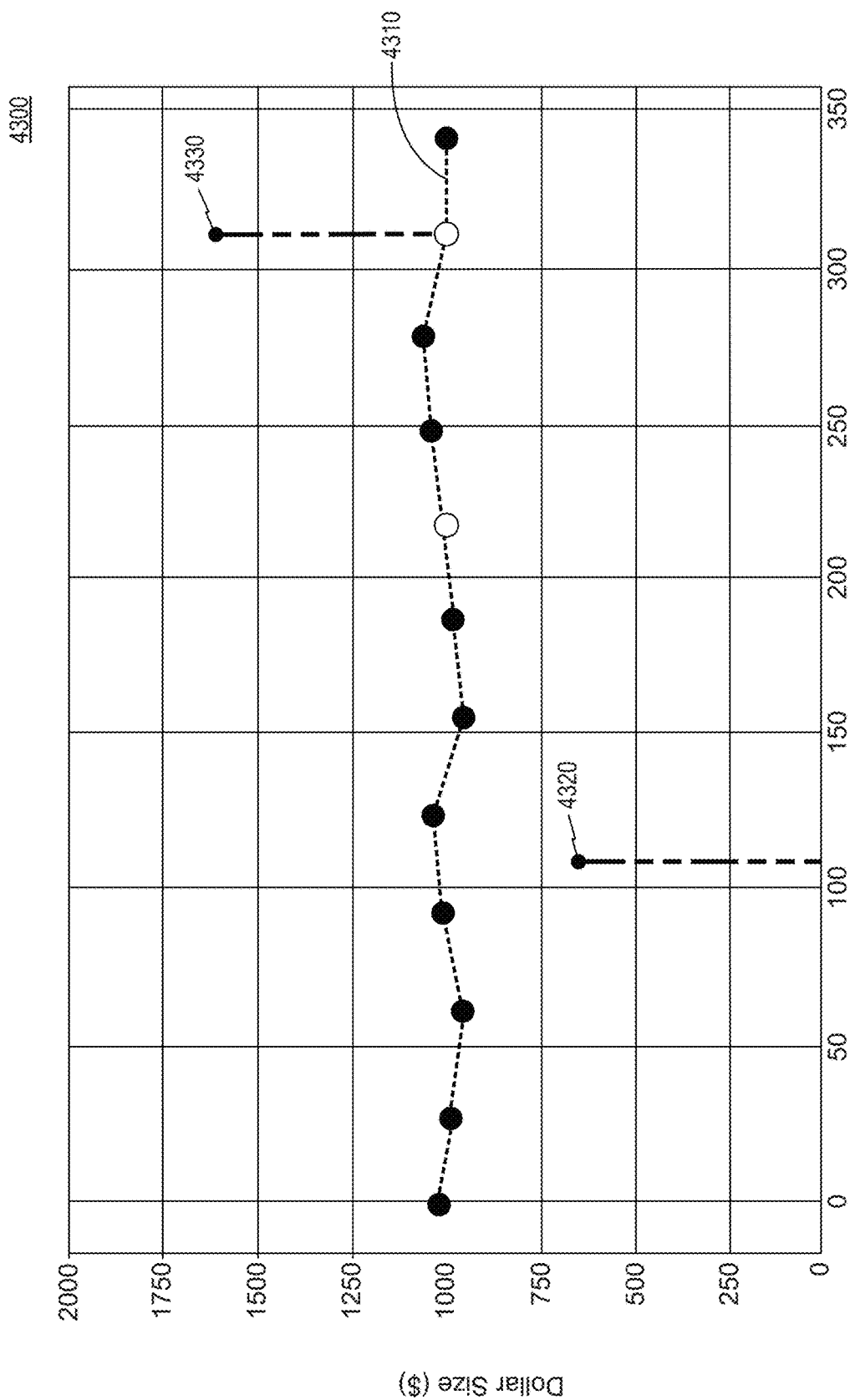
FIG. 4C illustrates a graphical representation of an exemplary income stream consistent with certain disclosed embodiments.

FIG. 4C illustrates a graphical representation of exemplary income stream 4300 of an identified cluster. Income stream 4300 may include one or more data elements assigned to steady stream 4310 and one or more data elements 4320 and 4330 assigned to an unsteady stream. Data element 4320 may represent a negative unsteady income transaction associated with a non-time steady stream. Data element 4330 may represent a positive unsteady income transaction associated with a time steady stream.

Returning to FIG. 4A, step 4140, processor 1110 may calculate a composite income. Processor 1110 may calculate a composite income based on a predetermined rule associated with the one or more stream types determined at steps 4250 and 4270 and associated with the cluster data and/or one or more generated tables. In some embodiments, processor 1110 may aggregate a steady income and/or an unsteady income associated with the identified cluster based on one or more predetermined rules. For example, in some embodiments, one or more of a bonus income, commission income, or overtime unsteady stream type representing an unsteady income transaction may be added to a base income representing a steady income to calculate a composite income.

At step 4150, processor 1110 may determine a net income. Processor 1110 may aggregate one or more composite incomes associated with a first income type label and a plurality of income source labels to determine a net income 2710.

Figure 5:
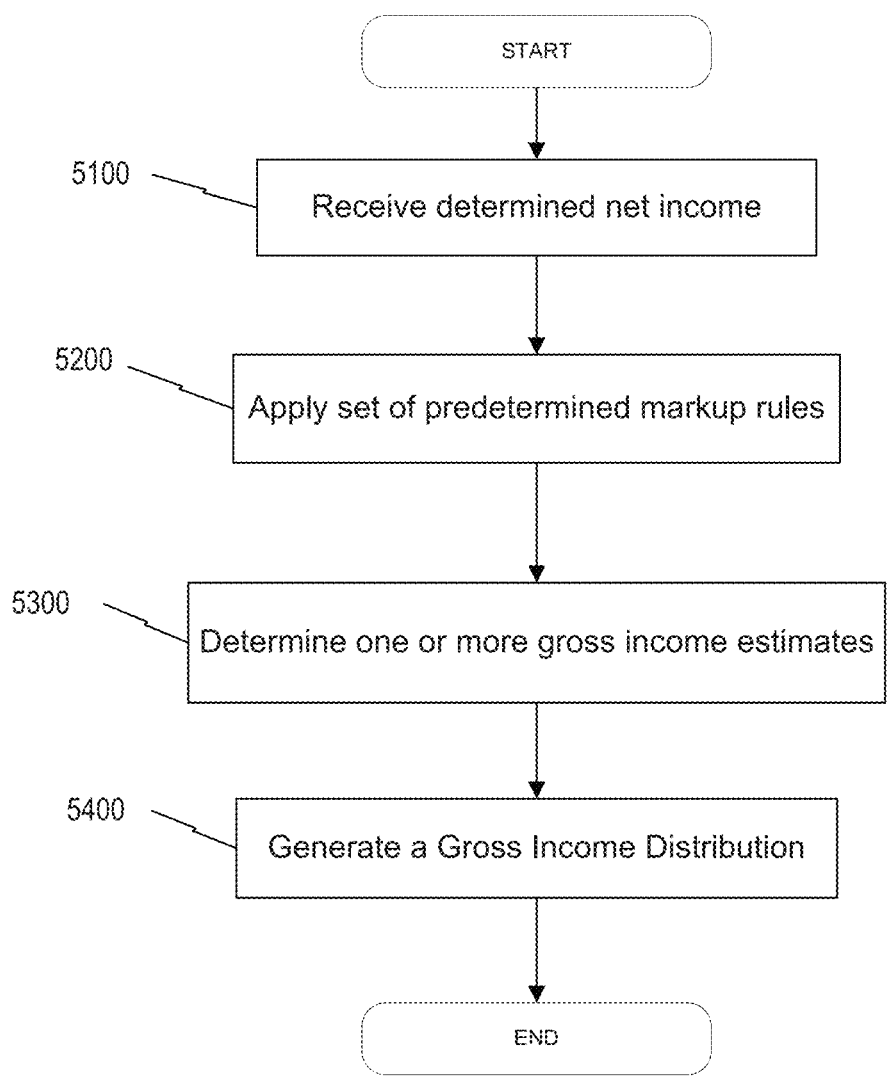
FIG. 5 illustrates an exemplary flowchart for determining a gross income consistent with certain disclosed embodiments.

FIG. 5 illustrates an exemplary flowchart 5000 for analyzing net income for generating a gross income distribution. Disclosed embodiments may generate a gross income distribution to integrate the disclosed systems and techniques with current systems for approving and underwriting loans, thereby enhancing loan origination systems without requiring a complete overhaul of the loan origination process. The gross income distribution may be estimated using net income 2710 determined at step 4150. In some embodiments, information from a set of transaction data (including for example, paystub data comprising a breakdown of one or more tax deductions by a type and an amount, e.g., federal and state tax withholding, a 401(K) contribution, and/or health insurance). The transaction data may be used to estimate a distribution of monthly gross income for a net income. In some embodiments, the net income may correspond to a monthly net income. The gross income distribution may be estimated and/or generated using a machine learning model (such as a neural network) to estimate the impact of one or more types and/or amounts of paycheck deduction indicated in the set of transaction data.

Net to gross income (NGI) generator 2400 may execute instructions for processing net income 2710 and generating gross income distribution 2720. Gross income distribution 2720 may represent a range of estimates of gross incomes correlating to net income 2710 and may account for extrinsic financial factors. Extrinsic financial factors may include including spending and saving habits of an individual. NGI generator 2400 may determine gross income distribution 2720 by applying one or more predetermined rule associated with net income 2710.

In some embodiments, determining a gross income distribution ay include determining, based on a predetermined rule associated with a determined net income, a lower bound gross income and an upper bound gross income. The predetermined rule may be based on an analysis of a mixed density model for a plurality of stored net to gross associations. The gross income distribution may include a marginal gross distribution. The marginal gross income distribution may include lower bound gross income representing a lower percentile rank of the gross income distribution and the upper bound gross income representing an upper percentile rank of the gross income distribution.

At step 5100, processor 1110 may receive a determined net income. In some embodiments, NGI generator 2400 may receive the determined net income from transaction processor 2500.

At step 5200, processor 1110 may apply a set of predetermined markup rules to the determined net income. The set of predetermined markup rules may include one or more percentages or rates for adjusting, or scaling, the determined net income. The set of predetermined markup rules may be based one or more data regression models generated based on historical net income-gross income mapping data.

At step 5300, processor 1110 may determine one or more gross income estimates based on the set of predetermined markup rules. Processor 1110 may apply the set of predetermined rules associated with a determined net income to determine one or more gross incomes. Each gross income estimate may represent a gross income likely to correspond to the determined net income.

At step 5400, processor 1110 may generate a gross income distribution. The gross income distribution may be based on the one or more gross income estimates. In some embodiments, the gross income distribution may be generated for each income source or for a plurality of income streams attributable to the borrower. The gross income distribution may include a range of gross incomes likely to correspond to the determined net income. In some embodiments, the gross income distribution may be represented as a probability that a borrower's net income corresponds to a particular gross income estimate.

Figures 6A, 6B:
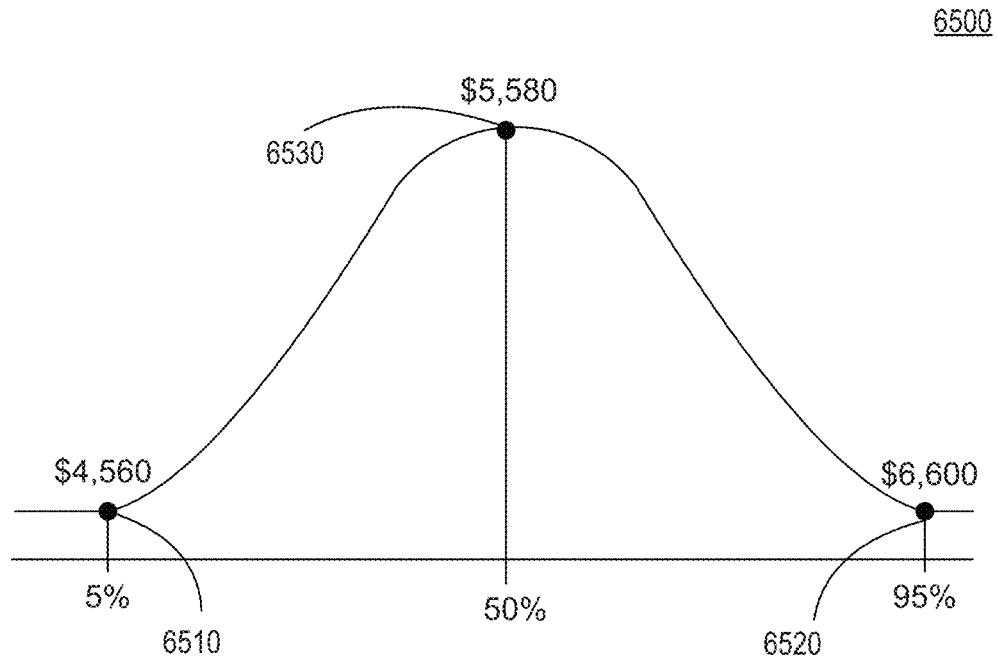
FIG. 6A illustrates an exemplary markup table for determining an estimated gross income.
FIG. 6B illustrates an exemplary gross income distribution consistent with certain disclosed embodiments.

FIG. 6A illustrates an exemplary markup table representing a set of predetermined rules for determining a gross income estimate. First markup table 6100 and second markup table 6200 may include markup percentages, each markup percentage corresponding to a range of net incomes. The net incomes may be represented as an annual income or a monthly income. First markup table 6100 may include a list of markup percentages for providing a first gross income estimate. In some embodiments, the first gross income estimate may be associated with a relatively low potential of borrower default. The list of markup percentages may represent fifth percentile markup percentages. A fifth percentile gross income estimate may represent a gross income associated with the determined net income, wherein 5% of individuals associated with the determined net income had declared gross incomes less than the fifth percentile gross income estimate.

Second markup table 6200 may include a list of markup percentages for providing a first gross income estimate. A gross income estimate based on a rule associated with second markup table 6200 may represent a ninety-fifth percentile gross income estimate. A ninety-fifth percentile gross income estimate may represent a gross income associated with the determined net income, wherein 95% of individuals associated with the determined net income had declared gross incomes less than the ninety-fifth percentile gross income estimate.

FIG. 6B illustrates an exemplary graphical representation of a gross income distribution table. Gross income distribution 6500 may represent a range of gross income estimates associated with a determined net income of $4,000. Gross income distribution 6500 may include a lower bound gross income estimate 6510 and upper bound gross income estimate 6520. Lower bound gross income estimates 6510 may be determined based on a predetermined markup rule associated with the determined net income and a fifth percentile. Upper bound gross income estimates 6520 may be determined based on a predetermined markup rule associated with the determined net income and a ninety-fifth percentile. Gross income distribution 6500 may also include median gross income estimate 6530 associated with the determined net income and a fiftieth percentile.

Returning to FIG. 2, processor 1110 may execute instructions for determining a statistical estimate of one or more characteristics of a borrower, a requested loan and/or a property associated with the borrower or the loan. The statistical estimated may be used to generate a profile report, which may be used by lender 2720 with gross income distribution 6500 to analyze a borrower's predicted repayment capacity relative to a predetermined policy set by lender 2720. In some embodiments, determining the statistical estimate may include analyzing an upper and lower percentile estimate of the marginal gross income distribution. In some embodiment, a minimum gross monthly income may be determined based on the predetermined policy using a quantitative method that combines incomes across sources and using a statistical model. The statistical model may include a risk level associated with the borrower with respect to a loan application. The minimum gross monthly income may be used in conjunction with the profile report as a factor in assessing the likelihood that a borrower will be approved for a loan.

In some embodiment, Profile generator 2500 may be configured to execute instructions to generate a profile report 2730 for indicating borrower 1300's estimated capacity to repay a loan based on statistical analyses disclosed herein using electronic transaction data. Profile generator 2500 may analyze gross income distribution 2720 in view of one or more loan terms of a loan or loan application and generates profile report 2730. Profile report 2730 may include a statistical assessment generated based on analysis of the transaction data using one or more rule sets discussed herein, to be transmitted to lender 1400.

In some embodiments, profile generator 2500 may compare loan data 2630 with gross income distribution 2720, wherein loan data 2630 includes a minimum gross income required by lender 1400 to qualify for loan approval. Loan data 2630 may also include an indication of an eligibility of borrower 1300 for a particular loan as determined by lender 1400, or a statistical assessment of borrower 1300's potential for defaulting on a particular loan as determined by lender 1400, one or more predetermined threshold parameters set by lender, and/or additional documentation provided by borrower 1300. Profile report 2730 may include a range of estimates of a borrower capacity to repay based one or ore data elements included in loan data 2630 and/or borrower data 2620. Profile generator 2500 also may include an under-writing qualification system and/or a standalone application program interface (API) for determining and/or transmitting a decision of eligibility for a particular loan based on profile report 2730.

For example, NGI generator 2400 may determine lower bound gross income 6510 and an upper bound gross income 6520 of gross income distribution 2720 corresponding to a determined net income. Profile generator 2500 may compare lower bound gross income 6510 with a minimum gross income required by lender 1400 by a predetermined policy and determine that the lower bound gross income is greater than or equal to the minimum gross income required by lender 1400. Profile generator 2500 may also compare upper bound gross income 6520 with a minimum gross income required by lender 1400. Profile generator 2500 may determine that the upper bound gross income is not greater than or equal to the minimum gross income required by lender 1400.

Accordingly, profile generator 2500 may generate a profile report including an indication of a first repayment capacity of borrower 1300 associated with lower bound gross income, and an indication of a second repayment capacity of borrower 1300 associated with upper bound gross income. The indication may include a loan approval recommendation or a likelihood of default by borrower 1300. For example, in some embodiments, profile generator 2500 may determine that although upper bound gross income 6520 is not greater than or equal to the minimum gross income required by lender 1400, borrower 1300 may be able to demonstrate sufficient gross income to meet the minimum gross income required by lender 1400 by submitting additional verification documentation, information, or other proof of a change in life circumstances that may change the second repayment capacity indication, to indicate that borrower 1300 may be capable of repaying a larger loan than initially determined based on transaction data alone. Accordingly, profile generator 2500 may generate profile report 2730, wherein the report includes a request for additional documentation. Based on profile report 2730, borrower 1300 and/or lender 1400 may be able to negotiate one or more loan terms favorable to each party.

Processor 1110 may transmit any one of net income 2710 determined by transaction processor 2300, gross income distribution 2720 determined by NGI generator 2400, and/or profile report 2730 determine by profile generator 2500 to output device 1130. Output device 1130 may thereafter transmit net income 2710, gross income distribution 2720, and/or profile report 2730 to lender 1400 via communication channel 1200. In some embodiments, output device 1130 may retrieve net income 2710, gross income distribution 2720, and/or profile report 2730 stored in database 1140 using the unique identifier or security key associated with borrower 1300.

While various embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments. In particular, while exemplary methods have been described herein as a series of action, the order of the actions may vary in other implementations consistent with the present disclosure. Non-dependent acts may be performed in any order, or in parallel. Additionally, while exemplary data sources and calculation are described, the example and descriptions are not limiting and may cover the use of data sources or calculations to assemble a confidence profile of net income, gross income distributions, and attribute profiles associated with a particular borrower, loan, or loan application consistent with the present disclosure.

What is claimed is:
1. A system for automated income validation using electronic transaction data, the system comprising:
   one or more memory devices storing executable instructions;
   one or more processors configured to execute instructions to perform operations comprising:
   receiving transaction data associated with a financial account of a borrower, wherein the transaction data includes one or more data elements representing one or more income transactions;
   classifying at least a portion of the received transaction data using a machine learning model, wherein the machine learning model is trained using historical loan or loan application data and at least one set of classifying rules that is updated on a continuous or periodic basis to improve automated detection of the income transactions;
   analyzing one or more characteristics of the one or more data elements using one or more rule sets associated with a text mining technique, wherein the one or more characteristics includes a transaction description;
   associating, based on the analysis of the one or more characteristics, an income type label and an income source label with one or more data elements of the set of data elements;
   identifying a cluster of data elements associated with a first income source label, wherein the identified cluster includes a plurality of data elements associated with a first income type label;
   verifying, using a pattern matching algorithm, the cluster of data elements, wherein the verified cluster represents one more data elements of the identified cluster attributable to the borrower;
   analyzing cluster data associated with the verified cluster;
   calculating a cadence of the cluster data, wherein the cadence is based on a variation between a number of days between consecutive data elements in the verified cluster;
   determining a time period between a first income transaction and a second income transaction of the one or more income transactions, and based on whether the determined time period is greater than the cadence, identifying the time period as a gap in the one or more income transactions;
   calculating a dollar steadiness of the cluster data, wherein the dollar steadiness is based on a variation between a dollar value of a first data element in the verified cluster and a mean dollar value of the verified cluster;
   calculating at least one deviation metric, wherein the at least one deviation metric is based on a standard deviation and the mean dollar value of the verified cluster;
   determining, based on the deviation metric, a predetermined threshold;
   determining, based on the analyzed cluster data, one or more income streams;
   associating the at least one deviation metric with the one or more income streams;
   determining that the one or more income streams are not dollar steady, based on the determination that the associated deviation metric is less than the predetermined threshold;
   calculating, based on a transaction rule associated with the one or more determined income streams, a composite income;
   determining a net income associated with the first income type, wherein the determined net income includes the composite income; and generating, using the machine learning algorithm and based on the determined net income, a gross income distribution, wherein the gross income distribution represents a probability that the determined net income corresponds to a particular estimate of a gross income and the probability is specific to a particular borrower.

2. The system of claim 1, the operations further comprising:
  determining an income type associated with the one or more data elements, wherein the determined income type comprises at least one of a payroll payment, a social security payment, a pension payment, an alimony payment, or a child support payment.

3. The system of claim 1, wherein verifying the cluster of data elements further comprises:
  determining that a recipient name label associated with the data element matches a name associated with the borrower; or
  determining that the first income source label associated with the data element matches an employer name provided by the borrower.

4. A method for automated income validation, the method comprising:
  receiving transaction data associated with a financial account of a borrower, wherein the transaction data includes one or more data elements representing one or more income transactions;
  classifying at least a portion of the received transaction data using a machine learning model, wherein the machine learning model is trained using historical loan or loan application data and at least one set of classifying rules that is updated on a continuous or periodic basis to improve automated detection of the income transactions;
  analyzing one or more characteristics of the one or more data elements using one or more rule sets associated with a text mining technique, wherein the one or more characteristics includes a transaction description;
  associating, based on the analysis of the one or more characteristics, an income type label and an income source label with one or more data elements of the set of data elements;
  identifying a cluster of data elements associated with a first income source label, wherein the identified cluster includes a plurality of data elements associated with a first income type label;
  verifying the cluster of data elements using a pattern matching algorithm, wherein the verified cluster represents one more data elements of the identified cluster attributable to the borrower;
  analyzing cluster data associated with the verified cluster;
  calculating a cadence of the cluster data, wherein the cadence is based on a variation between a number of days between consecutive data elements in the verified cluster;
  determining a time period between a first income transaction and a second income transaction of the one or more income transactions, and based on whether the determined time period is greater than the cadence, identifying the time period as a gap in the one or more income transactions;
  calculating a dollar steadiness of the cluster data, wherein the dollar steadiness is based on a variation between a dollar value of a first data element in the verified cluster and a mean dollar value of the verified cluster;
  calculating at least one deviation metric, wherein the at least one deviation metric is based on a standard deviation and the mean dollar value of the verified cluster;
  determining, based on the deviation metric, a predetermined threshold;
  determining, based on the analyzed cluster data, one or more income streams;
  associating the at least one deviation metric with the one or more income streams;
  determining that the one or more income streams are not dollar steady based on a determination that the associated deviation metric is less than the predetermined threshold;
  calculating, based on a transaction rule associated with the one or more determined income streams, a composite income;
  determining a net income associated with the first income type, wherein the determined net income includes the composite income; and
  generating, based on the determined net income, a gross income distribution using the machine learning algorithm, wherein the gross income distribution represents a probability that the determined net income corresponds to a particular estimate of a gross income and the probability is specific to a particular borrower.

5. The system of claim 1, further comprising:
  detecting, based on a dollar steadiness greater than a predetermined dollar steadiness threshold, an outlier data element in the income stream; and
  assigning the outlier element to an unsteady stream.

6. The system of claim 1, wherein calculating the composite income further comprises:
  identifying a steady income stream;
  determining, based on an analysis of the identified steady income stream, a steady income; and
  determining, based on a transaction rule associated with the steady income stream, a steady stream type.

7. The system of claim 1, wherein the determining a gross income distribution comprises:
  determining, based on a predetermined rule associated with the determined net income, a lower bound gross income and an upper bound gross income.

8. The system of claim 7, wherein the predetermined rule is based on an analysis of a mixed density model for a plurality of stored net to gross associations.

9. The system of claim 8, the operations further comprising iteratively executing a machine learning algorithm to calculate the lower bound gross income and the upper bound gross income.

10. The system of claim 1, the operations further comprising:
  generating, based on the net income and one or more terms of a loan or a loan application, a profile report associated with the borrower;
  wherein the profile report includes a first estimate based on a lower bound gross income of the gross income distribution and a second estimate based on an upper bound gross income of the gross income distribution.

11. The system of claim 1, the operations further comprising:
  generating, based on the net income and one or more terms of a loan or a loan application, a profile report associated with the borrower;

the operations further comprising:
transmitting, via a network, the profile report including an indication of a repayment capacity of the borrower.

12. The system of claim 4, the operations further comprising:
determining that the calculated cadence is less than a cadence threshold; and
determining that the calculated dollar steadiness is less than a predetermined dollar steadiness threshold.

13. The method of claim 4, wherein verifying the cluster of data elements further comprises:
determining that a recipient name label associated with the data element matches a name associated with the borrower; or
determining that the first income source label associated with the data element matches an employer name provided by the borrower.

14. The method of claim 4, wherein calculating the composite income further comprises:
identifying a steady income stream;
determining, based on an analysis of the identified steady income stream, a steady income; and
determining, based on a transaction rule associated with the steady income stream, a steady stream type.

15. A non-transitory computer readable medium storing instructions that, when executed by a processor, cause the processor to execute instructions to perform a method comprising:
receiving transaction data associated with a financial account of a borrower, wherein the transaction data includes one or more data elements representing one or more income transactions;
classifying at least a portion of the received transaction data using a machine learning model, wherein the machine learning model is trained using historical loan or loan application data and at least one set of classifying rules that is updated on a continuous or periodic basis to improve automated detection of the income transactions;
analyzing one or more characteristics of the one or more data elements using one or more rule sets associated with a text mining technique, wherein the one or more characteristics includes a transaction description;
associating, based on the analysis of the one or more characteristics, an income type label and an income source label with one or more data elements of the set of data elements;
identifying a cluster of data elements associated with a first income source label, wherein the identified cluster includes a plurality of data elements associated with a first income type label;
verifying the cluster of data elements using a pattern matching algorithm, wherein the verified cluster represents one more data elements of the identified cluster attributable to the borrower;
analyzing cluster data associated with the verified cluster;
calculating a cadence of the cluster data, wherein the cadence is based on a variation between a number of days between consecutive data elements in the verified cluster;
determining a time period between a first income transaction and a second income transaction of the one or more income transactions, and based on whether the determined time period is greater than the cadence, identifying the time period as a gap in the one or more income transactions;
calculating a dollar steadiness of the cluster data, wherein the dollar steadiness is based on a variation between a dollar value of a first data element in the verified cluster and a mean dollar value of the verified cluster;
calculating at least one deviation metric, wherein the at least one deviation metric is based on a standard deviation and the mean dollar value of the verified cluster;
determining, based on the deviation metric, a predetermined threshold;
determining, based on the analyzed cluster data, one or more income streams;
associating the at least one deviation metric with the one or more income streams;
determining that the one or more income streams are not dollar steady based on a determination that the associated deviation metric is less than the predetermined threshold;
calculating, based on a transaction rule associated with the one or more determined income streams, a composite income;
determining a net income associated with the first income type, wherein the determined net income includes the composite income; and
generating, based on the determined net income, a gross income distribution using the machine learning algorithm, wherein the gross income distribution represents a probability that the determined net income corresponds to a particular estimate of a gross income and the probability is specific to a particular borrower.

16. The non-transitory computer readable medium of claim 15, wherein
verifying the cluster of data elements further comprises:
determining that a recipient name label associated with the data element matches a name associated with the borrower; or
determining that the first income source label associated with the data element matches an employer name provided by the borrower.

17. The non-transitory computer readable medium of claim 15, wherein
calculating the composite income further comprises:
identifying a steady income stream;
determining, based on an analysis of the identified steady income stream, a steady income; and
determining, based on a transaction rule associated with the steady income stream, a steady stream type.

18. The non-transitory computer readable medium of claim 15, the method further comprising:
detecting, based on the calculated cadence or the dollar steadiness greater than a predetermined dollar steadiness threshold, an outlier data element in the income stream; and
assigning the outlier element to an unsteady stream.

19. The system of claim 1 wherein the analyzing further comprises:
using the text mining technique to convert a string of text to produce a matrix of token counts;
using the token counts to determine a confidence rating for a transaction;
using the token counts to generate an integer identification for financial transactions.

20. The system of claim 1, wherein
the at least one set of classifying rules is associated with one or more n-grams, the one or more processors parse the received transaction data and generates a set of n-grams for one or more levels associated with a value n, and the one or more processors compare the set of n-grams against a predefined group of words.

* * * * *